(12) United States Patent
Karlsson et al.

(10) Patent No.: US 9,676,512 B2
(45) Date of Patent: *Jun. 13, 2017

(54) FORMING DEVICE, MACHINE, PACKAGING LAMINATE WEB, FORMING METHOD AND PROCESS IN PRODUCING PACKAGES

(71) Applicant: Tetra Laval Holdings & Finance S.A., Pully (CH)

(72) Inventors: Björn Karlsson, Lund (SE); Niels Damkjaer, Kävlinge (SE); Tomas Lagus, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 664 days.

This patent is subject to a terminal disclaimer.

(21) Appl. No.: 14/077,419

(22) Filed: Nov. 12, 2013

(65) Prior Publication Data

US 2014/0069992 A1    Mar. 13, 2014

Related U.S. Application Data

(63) Continuation of application No. 12/223,775, filed as application No. PCT/SE2007/000223 on Mar. 8, 2007, now Pat. No. 8,607,535.

(30) Foreign Application Priority Data

Mar. 31, 2006 (SE) ........................ 0600731

(51) Int. Cl.
*B32B 1/02* (2006.01)
*B65D 5/42* (2006.01)
(Continued)

(52) U.S. Cl.
CPC .............. *B65D 5/42* (2013.01); *B29C 65/368* (2013.01); *B29C 65/3656* (2013.01);
(Continued)

(58) Field of Classification Search
CPC ....... B32B 1/02; B32B 1/08; Y10T 428/1352; B65D 5/42; B65D 5/746; B29C 65/08; B29C 66/4312
See application file for complete search history.

(56) References Cited

U.S. PATENT DOCUMENTS 4,580,392 A    4/1986 Lagerstedt et al.
6,038,838 A    3/2000 Fontanazzi
(Continued)

FOREIGN PATENT DOCUMENTS

DE    29716230 U1    11/1997
EP    0 887 264 A1    12/1998
(Continued)

OTHER PUBLICATIONS

International Search Report.

*Primary Examiner* — Marc A Patterson
(74) *Attorney, Agent, or Firm* — Buchanan Ingersoll & Rooney PC

(57) ABSTRACT

A forming device and method for use in a packaging machine of the type where packages are produced from a tube. The forming device comprises two opposing sealing elements between which the tube is arranged to be flat-laid and squeezed to heat the thermoplastic and obtain a first transverse seal of the tube. It further comprises two volume control elements. The forming device is characterized in that it is arranged to displace the first transverse seal off-center in relation a longitudinal axis of the first portion of the tube in a displacement direction essentially perpendicular to the first transverse seal to enable later shaping of a correspond- (Continued)

ing final package with a wall arranged with a predetermined angle of inclination in relation to the displacement direction. The invention also relates to a machine, a process and a packaging laminate.

10 Claims, 5 Drawing Sheets

(51) Int. Cl.
- *B29C 65/36* (2006.01)
- *B29C 65/00* (2006.01)
- *B65B 9/20* (2012.01)
- *B65B 9/207* (2012.01)
- *B65B 51/30* (2006.01)
- *B65B 61/24* (2006.01)
- *B65D 5/74* (2006.01)
- *B32B 1/08* (2006.01)
- *B29C 65/08* (2006.01)
- *B29C 65/10* (2006.01)
- *B29K 101/12* (2006.01)
- *B29K 305/02* (2006.01)
- *B29K 711/12* (2006.01)
- *B29L 9/00* (2006.01)
- *B29L 31/00* (2006.01)

(52) U.S. Cl.
CPC .......... *B29C 66/1122* (2013.01); *B29C 66/43* (2013.01); *B29C 66/4312* (2013.01); *B29C 66/4322* (2013.01); *B29C 66/72321* (2013.01); *B29C 66/72328* (2013.01); *B29C 66/73921* (2013.01); *B29C 66/822* (2013.01); *B29C 66/8221* (2013.01); *B29C 66/83411* (2013.01); *B29C 66/83543* (2013.01); *B65B 9/207* (2013.01); *B65B 9/2035* (2013.01); *B65B 9/2049* (2013.01); *B65B 51/306* (2013.01); *B65B 61/24* (2013.01); *B65D 5/746* (2013.01); *B29C 65/08* (2013.01); *B29C 65/10* (2013.01); *B29C 66/49* (2013.01); *B29C 66/83241* (2013.01); *B29C 66/849* (2013.01); *B29K 2101/12* (2013.01); *B29K 2305/02* (2013.01); *B29K 2711/123* (2013.01); *B29K 2995/0069* (2013.01); *B29L 2009/00* (2013.01); *B29L 2031/7166* (2013.01); *B65B 9/2056* (2013.01)

(56) References Cited

U.S. PATENT DOCUMENTS

| | | | |
|---|---|---|---|
| 6,357,203 | B1 | 3/2002 | Cicha et al. |
| 8,607,535 | B2 * | 12/2013 | Karlsson ............ B29C 65/3656 53/451 |

FOREIGN PATENT DOCUMENTS

| | | |
|---|---|---|
| EP | 0947433 A1 | 6/1999 |
| EP | 1 332 969 A1 | 8/2003 |
| EP | 1 591 367 A1 | 11/2005 |

* cited by examiner

FORMING DEVICE, MACHINE, PACKAGING LAMINATE WEB, FORMING METHOD AND PROCESS IN PRODUCING PACKAGES

CROSS REFERENCE TO RELATED APPLICATION

This application is a continuation of application Ser. No. 12/223,775 filed Aug. 8, 2008, which is a National Stage of PCT/SE2007/000223 filed Mar. 8, 2007, and claims priority to Swedish Application No. 0600731-4 filed Mar. 31, 2006, the disclosures of all of which are incorporated herein by reference in their entirety.

TECHNICAL FIELD OF THE INVENTION

The present invention relates to a forming device and a forming method for use in a packaging machine of the type where individual packages are produced from a tube of thermoplastic coated packaging laminate. The invention also relates to a machine for producing packages comprising such a forming device, a packaging laminate web for producing packages by means of such a forming device and a process for producing packages comprising such a forming method. The forming device comprises two opposing sealing elements between which the tube is arranged to be flat-laid and squeezed to heat the thermoplastic and obtain a first transverse seal of the tube, and two volume control elements arranged on opposite sides of the tube and having a releasing state in which the tube is movable in relation to the volume control elements and a securing state for imparting a predetermined shape to the tube in a first portion between the first transverse seal and a successive second transverse seal of the tube.

BACKGROUND ART

Within the food industry, beverages and other products are often packed in paper or paperboard based packages. Packages intended for liquid food are often produced from a packaging laminate comprising a relatively robust core layer of paper or paperboard and an outer, liquid-tight layer of thermoplastic material on at least that side of the core layer which will form the inside of the packages. For particularly oxygen sensitive food products, such as fruit juice and cooking oil, the packaging laminate usually further comprises a layer of a gas barrier material. This layer is in most cases an aluminum foil which also enables induction sealing of the packaging laminate.

The packages are often produced in a packaging machine where a web of packaging laminate is formed into a tube which is closed by sealing of the longitudinal edges of the web in an overlapping condition. The longitudinally sealed tube is continuously filled with a product and then transversally sealed, wherein filled "cushions" are formed. The transverse sealing is made along narrow, transverse, mutually spaced apart, sealing zones. After the transverse sealing, the "cushions" are separated from the rest of the tube by incisions in the sealing zones and finally formed into the desired shape. The "cushions" can, as an example, be formed, by mechanical folding, into parallelepiped-shaped packages like the ones commercialized by the applicant under the name Tetra Brik or Tetra Brik Aseptic (registered trade marks).

A packaging machine of the above type is known from U.S. Pat. No. 4,580,392. This packaging machine comprises alternately working forming and sealing jaws which are given a reciprocating movement in the longitudinal direction of the tube and in the transverse direction of the tube. The sealing jaws are guided and driven by guiding and driving rods which run parallel to the tube and to which different reciprocating movements are imparted. Attached to the sealing jaws are forming flaps determining the shape of the finished packing container and therefore also its volume.

Packages are often provided with an opening device for facilitating consumption of the product in the package. Different types of opening devices can be used, for example an opening device comprising a frame fitted to the top wall of the package and defining an opening of the same, and a removable cap hinged or screwed to the frame. The top wall of the package formed from the tube of packaging laminate will comprise a number of seals resulting from the longitudinal and transverse sealing. Because of technical difficulties, it is not preferred to arrange the opening device in an area of a seal. Therefore, the amount of space available for positioning of the opening device on the top wall of the package is quite limited. As an example, in the case of a Tetra Brik package, the top wall is centrally crossed by a transverse seal. Further, an end portion of the longitudinal seal extends centrally across half the top wall, perpendicularly from the transverse seal. Obviously, this limits the maximum size of the opening device used. However, in many situations a relatively large opening device is desired. As an example, when the product to be packed is semiliquid or contains fibres or larger particles, a bigger opening device is required to enable smooth pouring of the product.

Further, an opening device usually protrudes from the package which may be drawback when it comes to stacking of the package. As an example, in the case of Tetra Brik packages provided with a respective opening device on the top wall, stacking of the packages on top of each other may be difficult. In a stack, the uppermost package will be supported by the opening device on the second uppermost package and so on. Obviously, this is not a stable configuration, especially since the opening device, as apparent from above, is arranged off-center at the top wall and has a limited size.

To increase the space available for positioning of the opening device on the top wall of the package it has been proposed to provide the front edge of the top wall of the package, which front edge is opposite the edge of the top wall crossed by the longitudinal seal, with a convex C-shaped bend line or so-called "smile crease", instead of a straight one. However, a package produced in accordance with this solution will naturally not have the shape of a perfect parallelepiped because of the increased top wall area. Instead, the front side wall of the package, which is adjacent to the front edge of the top wall, will be projecting in an area close to the C-shaped bend line. Further, the top wall will be sloping downwards from the transverse seal to the C-shaped bend line. The more convex the bend line is, the more the package will differ from the parallelepiped-shape. Thus, the purpose of the C-shaped bend line is to enable the provision of a relatively large opening device on the package. With such a relatively large opening device, the above discussed stacking problems will most likely still be present. Further, there may also be problems relating to stowing of these "smile crease" packages in rows with the front side wall of one package facing the opposite back side wall of the neighboring package because of the projection of the front side wall.

SUMMARY OF THE INVENTION

An object of the present invention is to provide a forming device, a machine comprising such a forming device, a packaging laminate web for use in connection with such a forming device, a forming method and a process comprising such a forming method which, at least partly, eliminate potential limitations of prior art. The basic concept of the invention is to provide an opportunity for producing a package where the position of one of the transverse seals have been moved from the center so as to give the package an inclined top and/or bottom wall.

The forming device, machine, packaging laminate web, forming method and process for achieving the object above are defined in the appended claims and discussed below.

A forming device for use in a packaging machine of the type where individual packages are produced from a tube of thermoplastic coated packaging laminate, according to the present invention comprises two opposing sealing elements between which the tube is arranged to be flat-laid and squeezed to heat the thermoplastic and obtain a first transverse seal of the tube. The forming device further comprises two volume control elements arranged on opposite sides of the tube and having a releasing state in which the tube is movable in relation to the volume control elements and a securing state for imparting a predetermined shape to the tube in a first portion between the first transverse seal and a successive second transverse seal of the tube. The inventive device is characterized in that it is arranged to displace the first transverse seal off-center in relation a longitudinal axis of the first portion of the tube in a displacement direction essentially perpendicular to the first transverse seal to enable later shaping of a corresponding final package with a wall arranged with a predetermined angle of inclination in relation to the displacement direction.

One advantage with the present invention is that already existing forming devices for holding and sealing a tube of packaging laminate can be modified so as to embody the inventive way of handling the tube. For example, the positioning and/or movement, in relation to the tube, of the sealing jaws and forming flaps could be altered in the initially discussed known machine.

As the name indicates, the volume control elements are arranged to make sure that the final packages contain the desired volume of product by pressing onto the tube in a predetermined way in the securing state in connection with transverse sealing.

The successive second transverse seal, and therefore the first portion of the tube, can be arranged on either side of the first transverse seal, i.e. upstream or downstream there from.

The first and second transverse seals are arranged to be cut at a later stage, as initially mentioned, to each form a top transverse seal and a bottom transverse seal of two final consecutive packages.

Said first portion of the tube is arranged to form a piece of the final package limited by the top and bottom transverse seals.

The forming device according to the present invention is advantageous since it makes it possible to, in a fast and neat way, produce packages with a respective inclining wall having a relatively large space available for positioning of an opening device. The inclining wall gives the package, when this is provided with a suitable opening device, better stacking possibilities. Additionally, in connection with this package, the initially described problems related to stowing can be eliminated.

As an example, the inventive forming device can be constructed so as to enable later shaping of a corresponding final package with a wall arranged with a predetermined angle of inclination in relation to an opposite wall.

According to one embodiment, the sealing elements are arranged to move towards and apart from each other parallel to the displacement direction being essentially perpendicular to a sealing element center axis being essentially perpendicular to the first transverse seal and extending between the sealing elements. Further, the sealing element center axis is tilted in relation to the longitudinal axis of the first portion of the tube when the volume control elements are in the securing state to achieve the displacement of the first transverse seal.

A forming device according to the paragraph above can be constructed in such a way that the sealing element center axis is tilted in relation to the longitudinal axis of the first portion of the tube when the volume control elements are in the releasing state and in relation to a longitudinal axis of a second portion of the tube when the volume control elements are in the releasing state and in the securing state. The first and second portions of the tube are arranged on opposite sides of the second transverse seal, and the longitudinal axes of the first and second portions of the tube coincide when the volume control elements are in the releasing state and in the securing state. Thus, in other words, this embodiment is based on tilting the tube in relation to the center axis of the sealing elements from the first transverse seal and upstream or downstream depending on the arrangement of the second transverse seal in relation to the first transverse seal. Naturally, either of the positioning of the tube or the positioning of the sealing elements can be altered to achieve the desired relative tilt.

Alternatively, the forming device can be constructed in such a way that the sealing element center axis is essentially parallel to the longitudinal axis of the first portion of the tube when the volume control elements are in the releasing state and in relation to a longitudinal axis of a second portion of the tube when the volume control elements are in the releasing state and in the securing state. Like above, the first and second portions of the tube are arranged on opposite sides of the second transverse seal. However, the longitudinal axes of the first and second portions of the tube are here tilting in relation to each other when the volume control elements are in the securing state. Thus, this embodiment is based on "cracking" or "bending" the tube between the first and second portions of the same in connection with sealing. Thereby, when the volume control elements are in the securing state, the tube will be tilting in relation to the center axis of the sealing elements from the first transverse seal to the second transverse seal, whereas the tube will remain straight from the second transverse seal and upstream or downstream depending on the arrangement of the second transverse seal in relation to the first transverse seal. An advantage with this embodiment is that already existing forming devices can be modified in a mechanically simple way to achieve a forming device according to the present invention.

The above discussed "cracking" or "bending" of the tube can, as an example, be achieved by a forming device further constructed so that the volume control elements are arranged to move from the releasing state to the securing state to move, in connection with sealing, the first portion of the tube from a state where its longitudinal axis is essentially parallel to the sealing element center axis and coincides with the longitudinal axis of the second portion of the tube to a state where the longitudinal axis of the first portion of the tube is tilted in relation to the sealing element center axis and the longitudinal axis of the second portion of the tube. Thus, this embodiment is based on deforming the tube by means of the volume control elements. The deformation could, e.g., be achieved by having differently shaped volume control elements or volume control elements journaled in different positions in relation the respective corresponding sealing elements.

According to another embodiment, just like above, the sealing elements are arranged to move towards and apart from each other parallel to the displacement direction being essentially perpendicular to a sealing element center axis being essentially perpendicular to the first transverse seal and extending between the sealing elements. However, according to this embodiment, the sealing elements are further arranged to move together in the displacement direction when the volume control elements are in the securing state to obtain a transverse movement of the sealing element center axis and achieve the displacement of the first transverse seal. Thus, this embodiment is based on transversally moving the sealing elements in a common motion in connection with transverse sealing, which elements are kept still in relation to each other during the motion. One advantage with this embodiment is that it enables relatively mild handling of the packaging laminate since no tilting and/or bending of the tube is necessary.

A forming device according to the present invention can be constructed so as to further comprise a shaping element arranged to press on the first portion of the tube to fold two opposing wall sections of the first portion along a respective folding line with the predetermined angle of inclination in relation to the displacement direction. This folding line can be imaginary but may coincide with a weakening line, a so-called crease line, if present, in the packaging laminate.

The shaping element can have any suitable shape, such as the shape of a plate or flap.

This embodiment is advantageous since it facilitates the later shaping of a corresponding final package with an inclined wall. As apparent from above, the folding lines will be parallel to the inclined wall of the final package.

The shaping element can be formed with a folding surface arranged to press on the first portion of the tube along one of the folding lines. If the shaping element is formed like a plate or a flap, the folding surface can be arranged along one edge of this plate or flap.

Further, the shaping element can be rotatable around an axis to move the folding surface into and out of contact with the first portion of the tube. The axis is, according to one embodiment, essentially parallel to the displacement direction when the volume control elements are in the securing state, which enables a relatively mechanically simple construction of the inventive device. According to another embodiment, the axis is instead essentially parallel to the folding lines when the volume control elements are in the securing state. An advantage with this design is that it enables a parallel arrangement of the part of the shaping element contacting the tube and the folding lines. Naturally, different directions of the axis of rotation mean different designs of the shaping element.

Besides for being rotatable around an axis, the shaping element may be movable along the axis to reduce friction between the shaping element and the tube during folding. Naturally, this embodiment is advantageous since it enables a more gentle handling of the tube which, in turn, reduces the risk of damaging the packaging laminate.

A machine for producing packages, according to the present invention, comprises a forming device as described above.

A packaging laminate web according to the present invention, for forming said tube for producing said individual packages by means of a forming device as described above, comprises a crease pattern corresponding to one package and repeating itself along the web. The final packages each comprises a front wall, a back wall, first and second opposing side walls, a bottom wall and a top wall, and in accordance therewith, the crease pattern comprises a front crease line defining an extension of the front wall in a longitudinal direction of said final package pointing towards the top wall and being parallel to the longitudinal axis of the first portion of the tube, a back crease line defining an extension of the back wall in said longitudinal direction, a first side crease line defining an extension of the first side wall in said longitudinal direction and a second side crease line defining an extension of the second side wall in said longitudinal direction. The first and second side crease lines are inclined in relation to a transverse direction of the web.

The crease pattern facilitates the shaping of a final package into the desired form, i.e. the shaping of a package with an inclined wall.

A forming method for use in a packaging machine of the type where individual packages are produced from a tube of thermoplastic coated packaging laminate, according to the present invention, comprises squeezing the tube in a flat-laid condition between two opposing sealing elements to heat the thermoplastic and obtain a first transverse seal of the tube. The forming method further comprises imparting, by means of two volume control elements arranged on opposite sides of the tube and being in a securing state, a predetermined shape to the tube in a first portion between the first transverse seal and a successive second transverse seal of the tube. The volume control elements have, besides for the securing state, a releasing state in which the tube is movable in relation to the volume control elements. The inventive method is characterized in that it further comprises displacing the first transverse seal off-center in relation a longitudinal axis of the first portion of the tube in a displacement direction essentially perpendicular to the first transverse seal to enable later shaping of a corresponding final package with a wall arranged with a predetermined angle of inclination in relation to the displacement direction.

A process for producing packages, according to the present invention, comprises a forming method as described above.

The characteristics discussed in connection with the inventive forming device are, of course, transferable to the inventive machine, packaging laminate web, forming method and process. Further, these characteristics may naturally be combined in the same embodiment.

BRIEF DESCRIPTION OF THE DRAWINGS

The invention will be described in more detail with reference to the appended schematic drawings, which show examples of presently non-limiting preferred embodiments of the present invention.

DETAILED DESCRIPTION OF PREFERRED EMBODIMENTS

Figure 1:
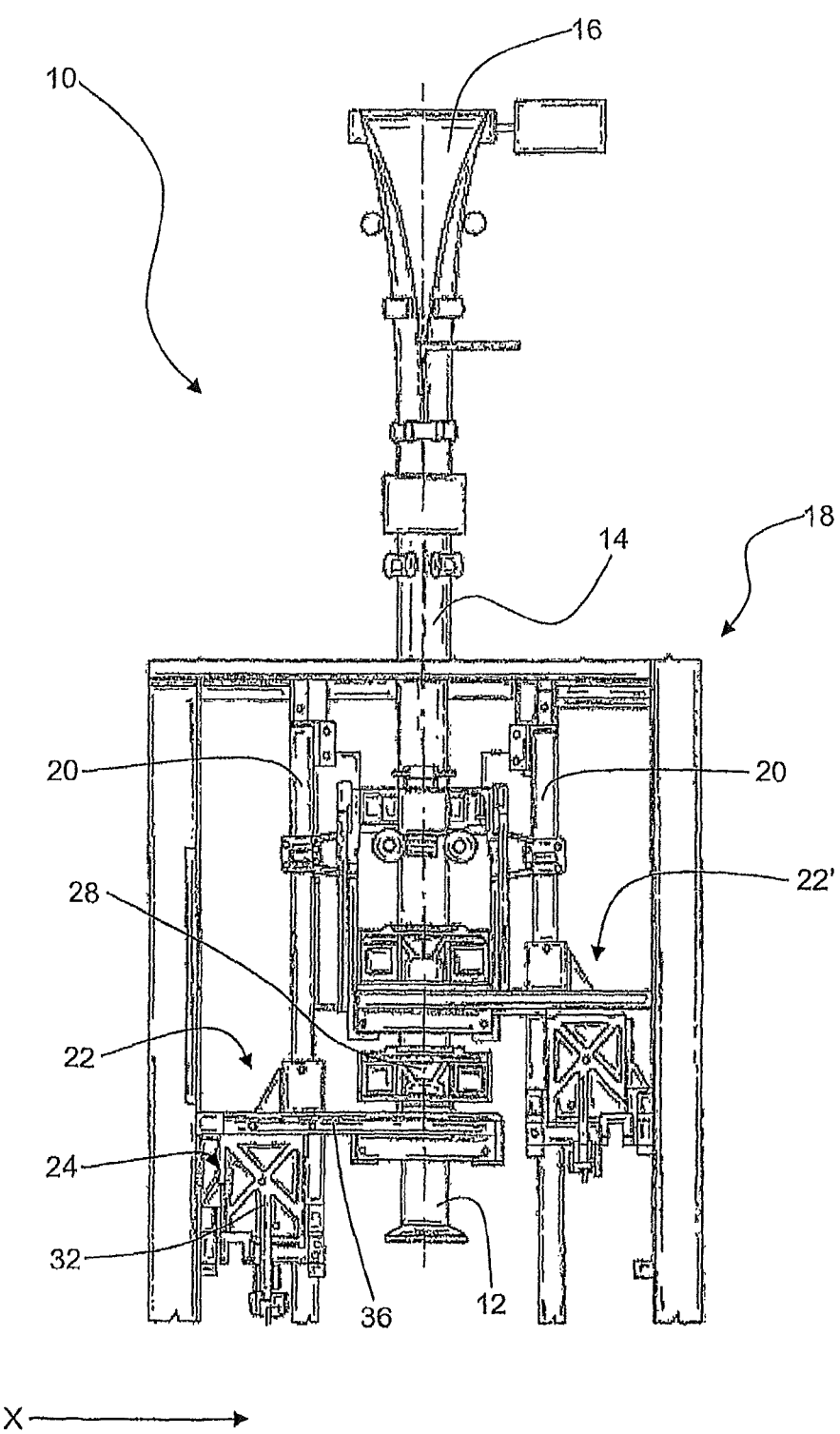
FIG. 1 is a schematic front view, with parts removed for clarity, of an inventive machine for producing packages.

In FIG. 1, a machine 10 for producing packages 12 from a tube 14 of packaging laminate is shown. The packaging laminate is of the initially described kind, i.e. it comprises a paper core layer, an aluminum gas barrier layer and outer layers of thermoplastic material. As initially described, the tube 14 is formed by sealing of the longitudinal edge sections of a web 16 of packaging laminate in an overlapping condition. After forming, the tube 14 is filled with the intended product. Continuous forming and filling of a tube like this is well-known and will not be described in detail herein.

After forming and filling, the tube 14 is fed to a forming unit 18. The forming unit 18 comprises two guides 20 arranged on opposite sides of the tube 14, and two forming devices 22, 22' which are slidably movable along the respective guides 20, between an upper end point and a lower end point on the guides. The forming devices are alternately interacting with the tube 14 to transversally seal it at regular intervals. As will be further discussed below, each transverse seal will, after cutting, form a top transverse seal and a bottom transverse seal of two final consecutive packages. Since the forming devices are essentially identical, the rest of the description will be directed mainly towards one of them, the forming device 22.

The forming device 22 comprises two sealing jaws 24, 26 and two corresponding volume control elements 28, 30 arranged on opposite sides of the tube 14. In turn, the jaws each comprise a main body 32, 34 and a support arm 36, 38 attached thereto and projecting sideways there from. In FIG. 1, only the sealing jaw 24, the volume control element 28, the main body 32 and the support arm 36 can be seen. The support arms of each sealing jaw carry a respective elongate sealing element (not shown in FIG. 1) between which the tube 14 is arranged to be flat-laid and squeezed to heat the thermoplastic by induction and obtain a transverse seal of the tube. The forming devices 22, 22' produce every other transverse seal so that, as an example, the forming device 22 produces the first, third and fifth seal, etc., whereas the forming device 22' produces the second, fourth and sixth seal, etc. In connection with transverse sealing, the volume control elements 28, 30 are arranged to act on the tube 14 to impart a predetermined shape to it in a portion between two successive transverse seals. Thus, the construction of the volume control elements determines the volume of the final packages.

The jaws 24, 26 are pivotable about a respective axis arranged at the bottom of the main body 32, 34 parallel to the direction X shown in FIG. 1. Further, the jaws of the forming device 22 are arranged to pivot in opposite directions to change the state of the forming device. The forming device 22, and therefore the volume control elements 28, 30, has a releasing state in which the jaws 24, 26 and the volume control elements 28, 30 are inclined away from each other and a securing state in which the jaws and the volume control elements are arranged essentially parallel to each other. In the releasing state, the volume control elements do not contact the tube 14 which is moveable in relation to them. In the securing state, the volume control elements contact the tube from opposite directions. The forming device 22 follows a predetermined cycle to achieve one single transverse seal. This cycle begins when the forming device 22 is arranged at the upper end point on the guide 20. The state of the forming device 22 then changes from the releasing state to the securing state. In connection therewith, the tube 14 is locked, first between the sealing elements and then also between the volume control elements 28, 30. Then, the forming device 22 moves downwards along the respective guide 20 and pulls the tube 14 along with it whereby a transverse seal is obtained. When the forming device reaches the lower end point on the respective guide 20, it changes its state from the securing state to the releasing state. Further, it starts moving in the opposite direction, i.e. upwards along the guide 20. When the forming device reaches the upper end point on the guide 20 the cycle is completed. The forming device 22' follows a similar, but time shifted, cycle to achieve one single transverse seal. The time shift equals half a cycle duration time which means that one of the forming devices 22, 22' always will be in the securing state to feed the tube continuously downwards. When the forming device 22 moves upwards from the lower end point to the upper end point, the forming device 22' will pass between the volume control elements 28, 30 and the sealing jaws 24, 26, or more exactly the sealing elements thereof, of the forming device 22, and vice versa.

Figure 2:
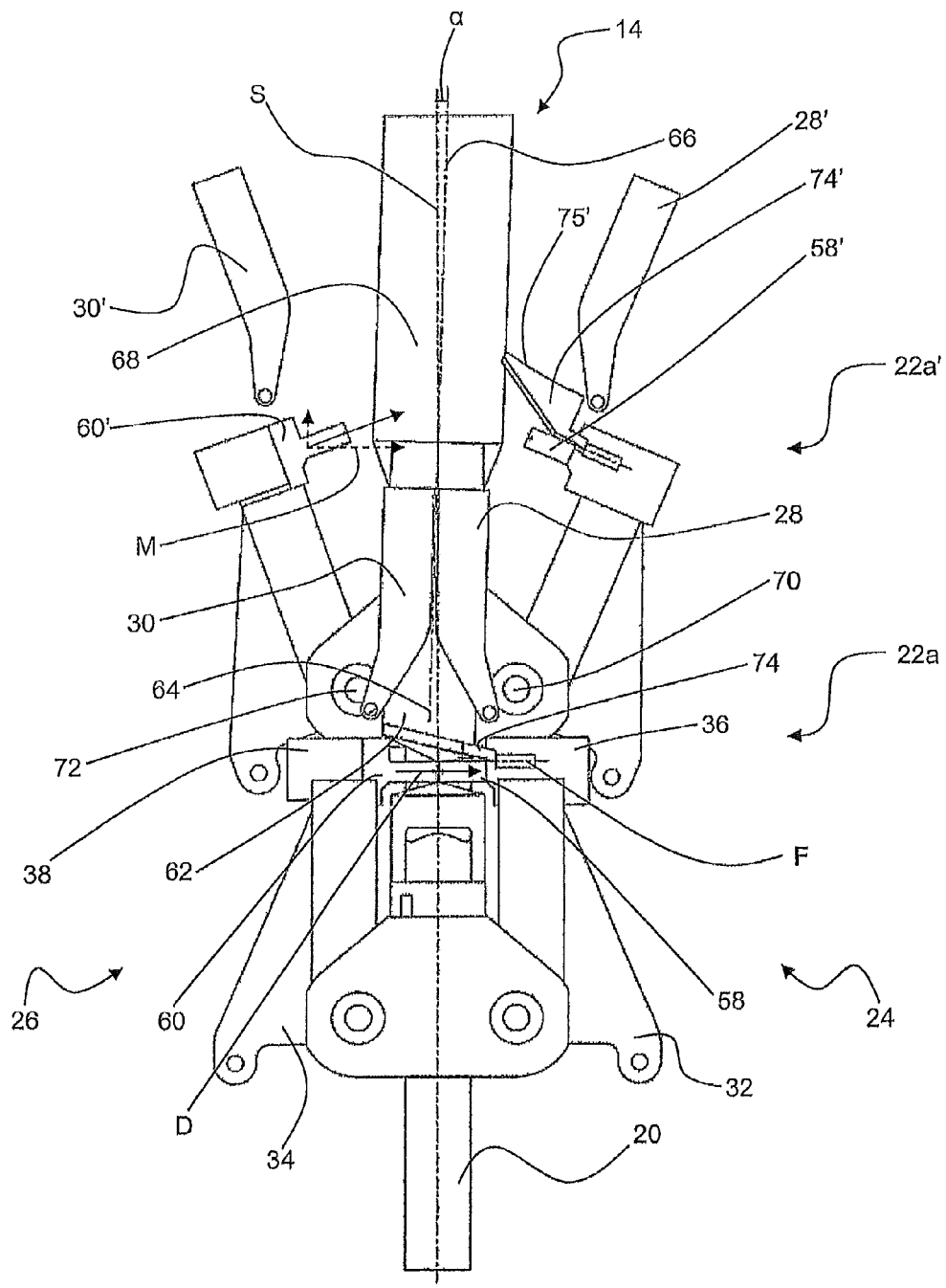
FIG. 2 is a schematic side view of two forming devices of the machine in FIG. 1 according to a first embodiment of the present invention.
Figure 3:
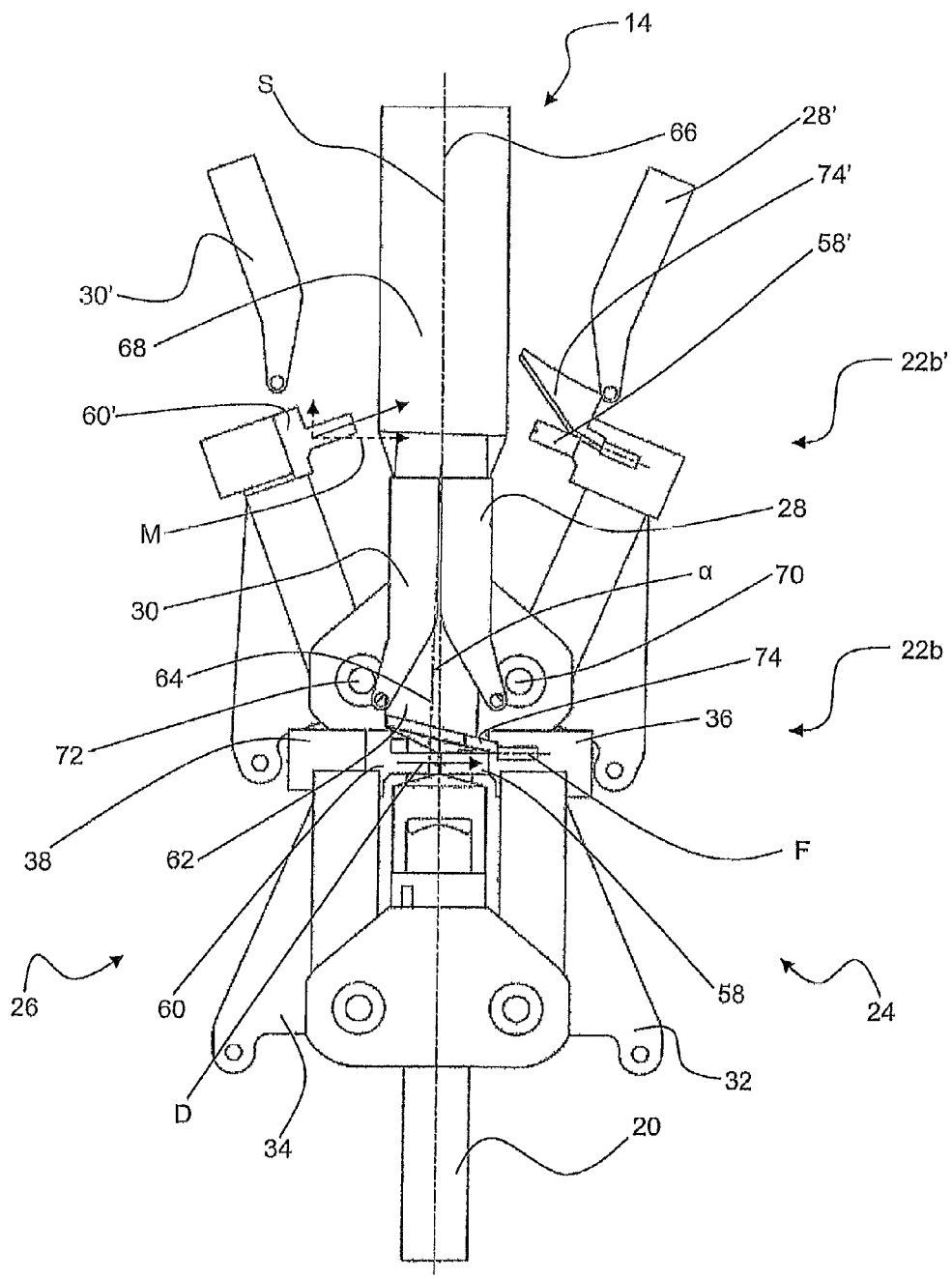
FIG. 3 is a schematic side view of two forming devices of the machine in FIG. 1 according to a second embodiment of the present invention.
Figure 4:
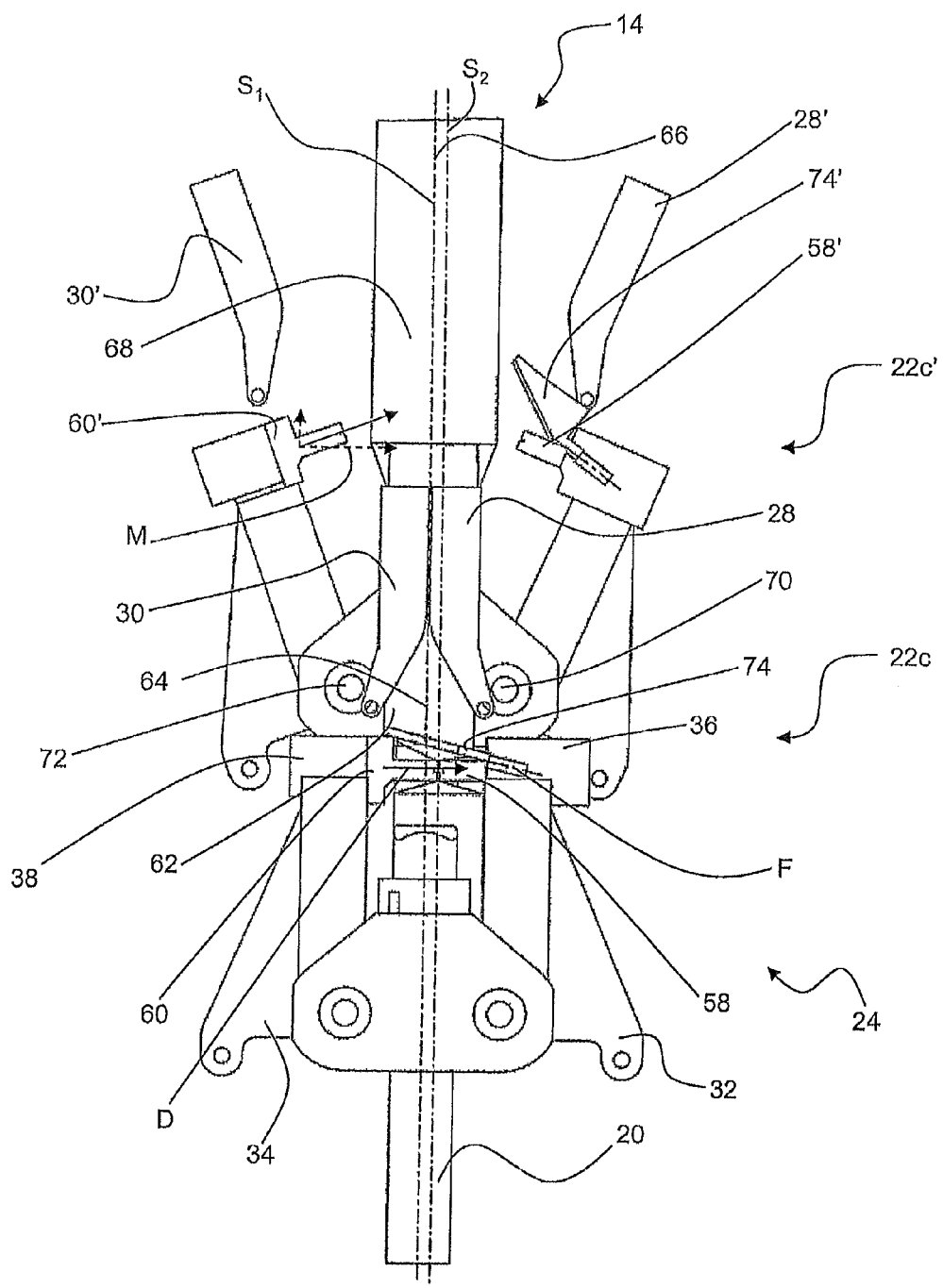
FIG. 4 is a schematic side view of two forming devices of the machine in FIG. 1 according to a third embodiment of the present invention.

First, second and third exemplary embodiments of the forming devices 22, 22', denoted 22a-22c and 22a'-22c', are shown in more detail in FIGS. 2, 3 and 4, respectively. By means of these forming devices, final packages, like the package 40 illustrated in FIG. 5, can be produced in three different ways. The package 40 comprises a front wall 31, a back wall 33, first and second opposing side walls 35 of which only the second one can be seen in the figure, a bottom wall 39 and a top wall 41. In FIG. 6, a sheet 42 of packaging laminate, corresponding to the single package 40, is shown. The sheet 42 comprises a specific crease pattern 44 composed of weakening lines or crease lines determining where the sheet should be folded to obtain the final package shape shown in FIG. 5. The crease pattern 44 comprises four longitudinal crease lines 43, 45, 47 and 49 dividing the sheet 42 into five portions 51, 53, 55, 57 and 59. It further comprises a transverse bottom crease line 61 and a top crease line 63 dividing each of the sheet portions into three sub portions 51a-c, 53a-c, 55a-c, 57a-c and 59a-c. The sub portions 51a, 55a and 59a are arranged to form together the top wall 41, while the sub portions 51c, 55c and 59c are arranged to form together the bottom wall 39, of the package 40. Further, the sub portions 51b and 59b are arranged to form together the back wall 33, while the sub portions 53b, 57b and 55b are arranged to form the first and second side walls 35 and the front wall 31, respectively, of the package 40. In fact, the top crease line 63 is composed of five sub crease lines, one for each of the sheet portions: a first back crease line 63a, a first side crease line 63b, a front crease line 63c, a second side crease line 63d and a second back crease line 63e. As apparent from FIG. 6, the front and back crease lines 63c and 63a+e are essentially parallel to the bottom crease line 61 while the side crease lines 63b and 63d are arranged with a predetermined angle of inclination β in relation to the front crease line. Further, the back crease lines are arranged at a larger distance from the bottom crease line than the front crease line which means that the extension of the back wall of the final package in a longitudinal direction L of the final package will be larger than the extension of the front wall.

Figure 5:
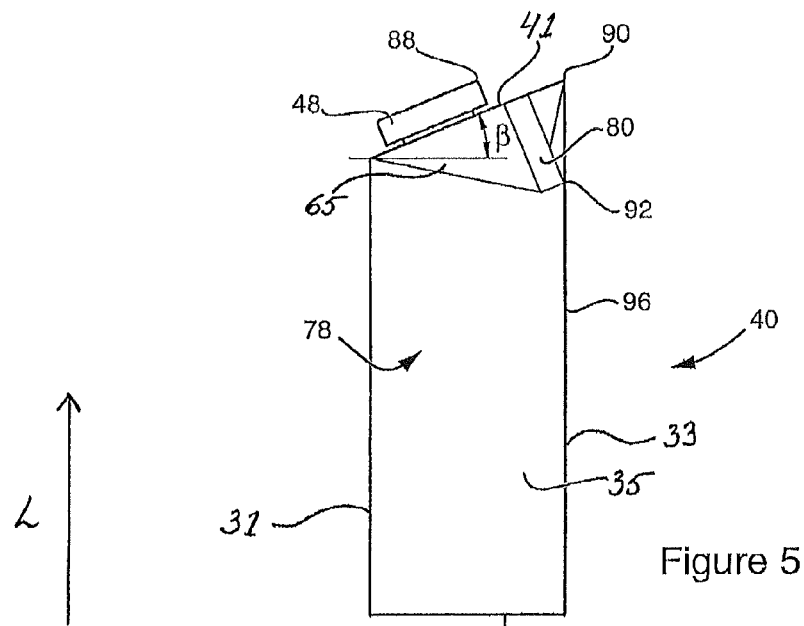
FIG. 5 is a side view of a final package that can be manufactured by means of a machine according to FIG. 1.
Figure 6:
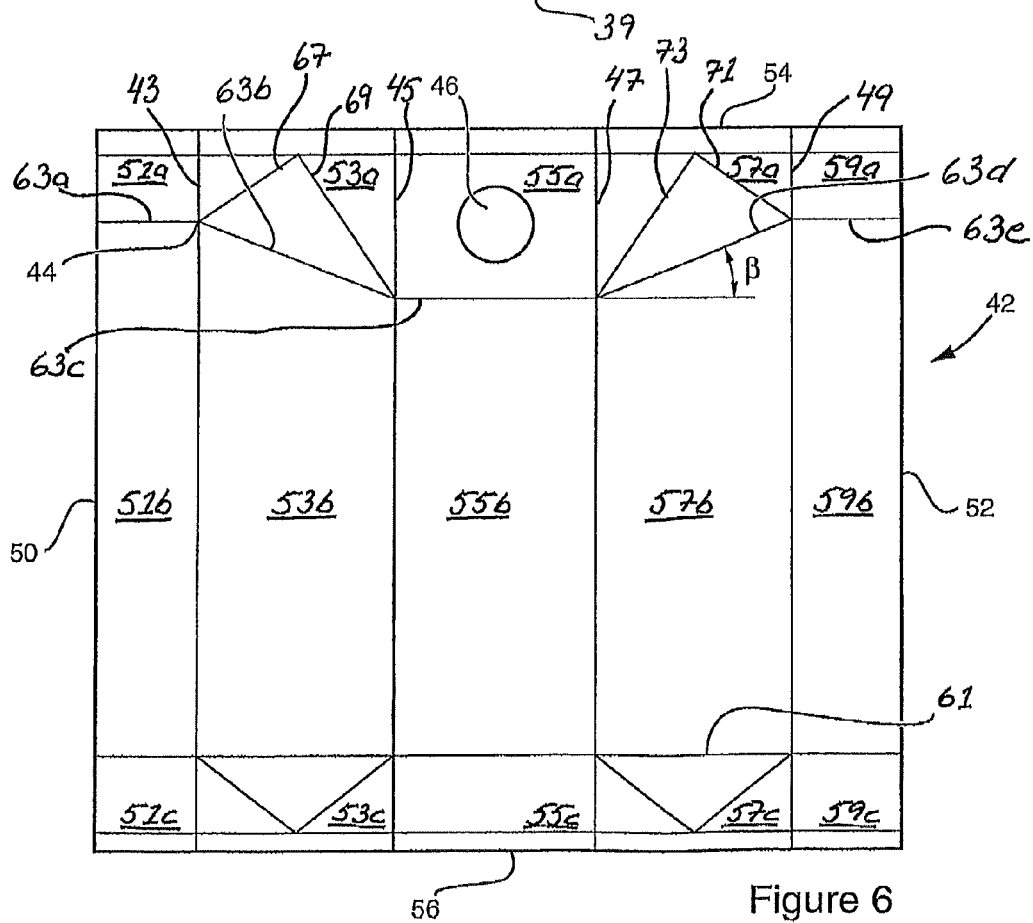
FIG. 6 is a front view of a sheet of packaging laminate corresponding to the package in FIG. 5.

The package 40 also includes two opposing triangular top flaps 65 of which only one can be seen in FIG. 5 and two opposing triangular bottom flaps (not shown and not further discussed herein). In accordance therewith, the crease pattern 44 further includes one pair of top flap crease lines 67, 69 and 71, 73 associated with each of the first and second side crease lines 63b and 63d. More particularly, the top flap crease lines 67 and 69 associated with the first side crease line 63b extend in the sub portion 53a, upwards and towards each other from a respective end of the first side crease line. Similarly, the top flap crease lines 71 and 73 associated with the second side crease line 63d extend in the sub portion 57a, upwards and towards each other from a respective end of the second side crease line. The sub portion 53a is arranged to form the top flap not shown in FIG. 5, which is composed of two layers of packaging laminate, one of the layers extending from the top wall and the other layer extending from the first side wall of the final package 40. Correspondingly, the sub portion 57a is arranged to form the top flap shown in FIG. 5, which is composed of two layers of packaging laminate, one layer extending from the top wall and the other layer extending from the second side wall of the final package 40. Once formed, the top flaps 65 are foldable along the respective first and second side crease lines 63b and 63d and thereafter attachable to the respective first and second side walls 35. As apparent form the figures, the top flap crease lines 67 and 69 together with the first side crease line 63b define the three edges of one of the triangular top flaps while the top flap crease lines 71 and 73 together with the second side crease line 63d define the three edges of the other one.

The sheet further comprises a temporarily sealed hole 46 for subsequent application of a suitable opening device 48. The edge portions 50 and 52 are arranged to be joined together in an overlapping condition for longitudinal sealing of the sheet and, thereby, forming of a tubular sleeve, while the edge portions 54 and 56 are arranged for a respective transverse sealing of this sleeve. The continuous web 16, which is shown in FIG. 1, consists of a long succession of sheets 42 adjoining each other at the respective edge portions 54 and 56. The web has mutually opposing longitudinal edge sections arranged to be joined together in an overlapping condition for forming of a longitudinal seal and thereby the tube 14, as previously mentioned. As apparent from the text above and the figures, the longitudinal seal will extend across the back wall and parts of the top and bottom walls of the final package. Obviously, the edge portions 50 and 52 are comprised in a respective one of these longitudinal edge sections and said sleeve forms a part of the tube. Further, the web has first, second, third, fourth, and so on, transverse sealing zones which are parallel to a transverse direction of the web and intended for the first, second, third, fourth, and so on, transverse seals of the tube, respectively. Obviously, the edge portions 54 and 56 constitute a respective half of two successive ones of these transverse sealing zones. For reasons of simplicity, the crease pattern and the prelaminated hole of the respective sheets cannot be seen in the other figures.

Thus, in FIG. 2, the forming devices 22a and 22a' according to a first embodiment of the invention are shown. The forming device 22a' is arranged in its releasing state while the forming device 22a is arranged in its securing state to squeeze and heat the tube 14 between its sealing elements 58 and 60 to obtain a first transverse seal. In connection with this transverse sealing, a first portion 62 of the tube is held between the volume control elements 28, 30. Later on, as described above, the forming device 22a will adopt its releasing state whereas the forming device 22a' will adopt its securing state to squeeze and heat the tube 14 between its sealing elements 58' and 60' to obtain the second transverse seal. In connection with this transverse sealing, the tube will be held between the volume control elements 28' and 30'.

As apparent from FIG. 2, the tube 14 is tilting by an angle α in relation to a vertical sealing element center axis S from the first transverse seal and upwards. Thus, the longitudinal axis 64 of the first portion 62 of the tube 14 deviates from the sealing element center axis S. Obviously, the longitudinal axis 66 of a second portion 68 of the tube arranged upstream from the second transverse seal also deviates from the sealing element center axis S but coincides with the longitudinal axis 64 of the first portion 62. In accordance therewith, to enable holding of the tilting tube, the essentially identical volume control elements 28, 30 of the forming device 22a are journaled at different heights from the respective sealing elements 58, 60. The jaws 24, 26 are arranged to rotate about respective shafts 70, 72 symmetrically arranged on opposite sides of the sealing element center axis S. Accordingly, the sealing elements 58, 60 move towards and apart from each other in a direction perpendicular to the first transverse seal. Similarly, the sealing elements 58', 60' move towards and apart from each other in a direction perpendicular to the second transverse seal, which is parallel to the first transverse seal, as illustrated by the arrow M in FIG. 2.

Each of the forming devices 22a, 22a' further comprises two shaping elements arranged on opposite sides of the volume control elements 28, 28' attached to the arms of the respective jaws. Only one shaping element per forming device, denoted 74 and 74', can be seen in FIG. 2. The shaping elements of the forming device 22a are arranged to press, with a respective folding surface thereof, on two opposing wall sections of the first portion 62 of the tube 14 in connection with transverse sealing to fold them along a respective imaginary folding line coinciding with a respective one of the first and second side crease lines 63b and 63d. Only the folding surface 75' of the shaping element 74' can be seen in FIG. 2. The shaping element 74 is composed of a folding flap arranged to rotate around an axis F, which is essentially horizontal when the forming device is in its securing state, to switch between a raised state and a lowered state. The shaping element is arranged to be in the raised state, which means no contact with the tube (like shaping element 74' in FIG. 2), when the forming device is in its releasing state, and in the lowered state, which means contact with the tube along the folding line (like shaping element 74 in FIG. 2), when the forming device is in its securing state. Thus, as the name indicates, the purpose of the shaping elements is to facilitate the shaping of the tube.

The tilting of the tube together with the construction of the volume control elements, the sealing elements and the shaping elements will result in a displacement of the first transverse seal off-center in relation the longitudinal axis 64 of the first portion 62 (and, thus, the longitudinal axis 66 of the second portion 68) of the tube 14 in a displacement direction D essentially perpendicular to the first transverse seal. This enables, as will be further discussed below, later shaping of a corresponding package 40 with a top wall 41 having a predetermined angle β of inclination in relation to the displacement direction D or in relation to the opposing wall of the package, here the bottom wall 31.

In the above described embodiment, the displacement of the first transverse seal is achieved by tilting the tube and the volume control elements in relation to the vertical sealing element center axis. Since the tilting is relative, the same displacement can naturally be achieved in other ways, e.g. by tilting the sealing element center axis in relation to a vertical tube and volume control elements arranged symmetrical with respect to the vertical direction.

In FIG. 3, the forming devices 22b and 22b' according to a second embodiment of the invention are shown. The states of the forming devices 22b and 22b' in FIG. 3 are the same as the states of the forming devices 22a and 22a' in FIG. 2. Just like in FIG. 2, the forming devices 22b, 22b' are arranged to make first and second transverse seals of the tube 14, respectively. To this end, like in FIG. 2, the jaws 24, 26 are arranged to rotate about the symmetrically arranged respective shafts 70, 72 to move the sealing elements 58, 60 towards and apart from each other in a direction perpendicular to the first transverse seal. The corresponding movement of the sealing elements 58', 60' is illustrated by the arrow M in FIG. 3. Further, a first portion 62 of the tube 14 is arranged to be held between the volume control elements 28, 30 of the forming device 22b in connection with sealing.

As apparent from FIG. 3, in an unaffected condition, the longitudinal axis 64 of the first tube portion 62, as well as the longitudinal axis 66 of the second tube portion 68, coincides with the vertical sealing element center axis S. However, just like in the previously described embodiment, the essentially identical volume control elements 28, 30 of the forming device 22b are journaled at different heights from the respective sealing elements 58, 60. Therefore, in accordance with this second embodiment, when the forming device 22b changes its state from the releasing state to the securing state, the volume control elements 28, 30 will move the first portion 62 from a position where its longitudinal axis 64 coincides with the sealing element center axis S and with the longitudinal axis 66 of the second portion 68 of the tube 14, to a position where the longitudinal axis of the first portion of the tube is tilted by an angle α in relation to the vertical sealing element center axis and the longitudinal axis of the second portion of the tube. Thus, in connection with transverse sealing, the tube is bent between the first and second portions so as to make the first tube portion tilt in relation to the rest of the tube.

Each of the forming devices 22b, 22b' further comprises two shaping elements arranged on opposite sides of the volume control elements 28, 28' attached to the arms of the respective jaws. Only one shaping element per forming device, denoted 74 and 74', can be seen in FIG. 3. The shaping elements of the forming device 22b are composed of a respective folding flap constructed just like the forming flaps of the forming device 22a described above with one exception. In addition to being arranged to rotate around an axis F, which is essentially horizontal when the forming device is in its securing state, to switch between a raised state and a lowered state, the folding flap is arranged to move along the axis F during the switch between the raised and lowered states so as to be more projecting from the respective arm in the lowered state (like shaping element 74 in FIG. 3) than in the raised state (like shaping element 74' in FIG. 3). This movement along the axis is advantageous since it reduces the friction between the tube and the shaping elements during folding of the opposing wall sections of the first tube portion along the respective folding lines.

The bending of the tube together with the construction of the volume control elements, the sealing elements and the shaping elements will result in a displacement of the first transverse seal off-center in relation the longitudinal axis 64 of the first portion 62 of the tube 14 in a displacement direction D essentially perpendicular to the first transverse seal. This enables, as will be further discussed below, later shaping of a corresponding package 40 with a top wall having a predetermined angle β of inclination in relation to the displacement direction D.

In FIG. 4, the forming devices 22c and 22c' according to a third embodiment of the invention are shown. The states of the forming devices 22c and 22c' in FIG. 4 are the same as the states of the forming devices 22a and 22a' in FIG. 2. Just like in FIG. 2, the forming devices 22c, 22c' are arranged to make first and second transverse seals of the tube 14, respectively. Further, a first portion 62 of the tube 14 is arranged to be held between the volume control elements 28, 30 of the forming device 22c in connection with sealing.

As apparent from FIG. 4, the longitudinal axis 64 of the first tube portion 62, as well as the longitudinal axis 66 of the second tube portion 68, are parallel to the vertical sealing element center axis S ($S_1$, $S_2$). In contrast to the two above described first and second embodiments, the essentially identical volume control elements 28, 30 of the forming device 22c are journaled at the same height from the respective sealing elements 58, 60. Like in the previously described embodiments, the jaws 24, 26 are arranged to rotate about the respective shafts 70, 72, which are symmetrically arranged on opposite sides of the vertical sealing element center axis $S_1$, to move the sealing elements 58, 60 towards and apart from each other in a direction perpendicular to the first transverse seal. The corresponding movement of the sealing elements 58', 60' is illustrated by the arrow M in FIG. 4. However, unlike the support arms 36, 38 of the above described forming devices 22a, 22b, the support arms 36, 38 of the forming device 22c are not fixedly attached to the respective main bodies 32, 34. Instead, the arms 36, 38 of the forming device 22c are arranged to be displaced in the transverse direction in relation to the respective main bodies 32, 34 when the forming device 22c is in the securing state. Since the sealing elements 58 and 60 are supported by the respective arms 36, 38, they will also be displaced in the transverse direction in connection with sealing to obtain the first transverse seal. Initially in the securing state of the forming device 22c, the sealing elements 58, 60 will be arranged so as to have a sealing element center axis $S_1$, which, as apparent from FIG. 4, coincides with the longitudinal axis 64 of the first tube portion 62, as well as the longitudinal axis 66 of the second tube portion 68. At the end of the securing state of the forming device 22c, the sealing elements will have moved together in the transverse direction so as to have a sealing element center axis $S_2$ which, as apparent from FIG. 4, is transversally displaced in relation to the longitudinal axes 64, 66 of the first and second tube portions 62, 68, respectively.

Each of the forming devices 22c, 22c' further comprises two shaping elements arranged on opposite sides of the volume control elements 28, 28' attached to the arms of the respective jaws. Only one shaping element per forming device, denoted 74 and 74', can be seen in FIG. 4. The shaping elements of the forming device 22c are composed of a respective folding flap constructed just like the forming flaps of the forming device 22a described above with one exception. The axis F around which the folding flap is arranged to rotate is not essentially horizontal but instead tilted so as to be parallel to the respective folding line when the forming device is in its securing state. Further, since the folding flap is attached to the support arm 36 of the forming device 22c, it will also be displaced in the transverse direction in connection with sealing. This transverse displacement can be compared to the movement along the axis of the folding flap of the forming device 22b according to the second embodiment, and it gives the same advantages.

The transverse movement of the sealing element center axis together with the construction of the volume control elements, the sealing elements and the shaping elements will result in a displacement of the first transverse seal off-center in relation the longitudinal axis 64 of the first portion 62 of the tube 14 in a displacement direction D essentially perpendicular to the first transverse seal. This enables, as will be further discussed below, later shaping of a corresponding package 40 with a top wall having a predetermined angle β of inclination in relation to the displacement direction D.

Thus, the present invention enables production of the package 40 shown in FIG. 5. The center part 78 of the package corresponds to the above referenced first tube portion 62. Further, the top transverse seal 80 and bottom transverse seal (not shown) correspond to the above referenced first and second transverse seals cut in half, respectively. The top wall 41 of the package 40 has a predetermined angle β of inclination in relation to the bottom wall 39. Naturally, as apparent from the above, the same angle can be identified between each of the folding lines, and thus, the first and second side crease lines 63b and 63d, and the bottom crease line 61 in FIG. 6. Since the top transverse seal 80 is not centrally positioned on the top wall 41 but displaced off-center, the area available for application of an opening device 48 on the top wall is considerably increased. Thus, the package can be provided with a relatively large opening device which makes it suitable also for semiliquid products and products containing fibres and larger particles. Further, this relatively large opening device can be provided on the package without having to change the cross section of the package, from being rectangular, in a plane parallel to the bottom wall 39, like in the case with the initially described "smile crease" package. In accordance therewith, the provision of large opening devices on the packages does not result in problems relating to stowing of the packages in rows and columns.

Additionally, as apparent from FIG. 5, the dimensions of the opening device to be applied onto the package can be chosen so that the highest point on the opening device 48, the point denoted 88, lies in essentially the same plane as the highest edge of the package 40, the edge denoted 90, when the package is in its normal state of transportation. Naturally, this greatly reduces the initially described problems associated with stacking of the packages on top of each other. In a stack, the uppermost package will be supported by the point 88 of the opening device and the edge 90 of the second uppermost package and so on. Obviously, this is a relatively stable configuration, especially since the support point 88 and the support edge 90 are well separated.

Naturally, the more off-centered the top transverse seal 80 is on the top wall 41 of the package 40, the more inclined the top wall is, and the more space is available for positioning of an opening device 48 on the top wall. However, in connection with packages of the above described type, there is a limit to how much the transverse seal can be off-centered without changing the package design of principle. In fact, FIG. 5 illustrates the extreme case with the top transverse seal off-centered as much as possible. In this extreme case, the edge 92 of the part of the transverse seal that has been folded down and attached to the second side wall 35 of the package is positioned precisely at the edge 96 of the second side wall. If the top wall were to be further inclined, the edge 92 of the transverse seal would project beyond the edge 96 of the second side wall which could remove some of the advantages of the package. Of course, such a projecting seal edge could be folded around the side wall edge and be attached at the back wall 33 of the package.

The above-described embodiment should only be seen as an example. A person skilled in the art realizes that the embodiments discussed can be modified and varied in a number of ways without deviating from the inventive conception.

For instance, the forming devices described above are all constructed so as to displace the first transverse seal in relation to the longitudinal axis of a first tube portion being arranged upstream from the first transverse seal. Naturally, the forming devices could be constructed in the opposite way, i.e. so as to displace the first transverse seal in relation to the longitudinal axis of a first tube portion being arranged downstream from the transverse seal.

Further, different designs of the shaping element have been combined with different designs of the rest of the forming device in the three above described exemplary embodiments. Of course, these combinations are just examples and any other combination of shaping element and the rest of the forming device is possible.

Further, in addition to the three above described different designs of the shaping element, it is possible to construct a shaping element which is arranged to rotate around, and move along, an axis which is tilted so as to be parallel to the respective folding line of the tube in connection with transverse sealing.

Also, the shaping element need not be constructed as a pivotable flap but can have other designs. As an example, the shaping element can be constructed as a bar transversally displaceable in a direction parallel to the transverse seals.

The volume control elements of the forming devices according to the above described first and second embodiments are asymmetrically journaled with respect to the corresponding sealing elements to accommodate a tilted tube portion. The same results could be obtained by having two asymmetrically designed, but symmetrically journaled, volume control elements.

The above described machine comprises two forming devices moving up and down along a respective guide to alternately transversally seal the tube and continuously feed it downwards. However, this is just one possible design and the machine could be constructed in other ways. As an example, the machine could be constructed so as comprise two endless chain conveyors and a number of forming devices. The forming devices are here separated so that one of the jaws is arranged along one of the chains, whereas the other jaw is correspondingly arranged at the other chain. Further, the tube is arranged to be received in the area between the chains. In this area, two correspondingly arranged jaws are arranged to engage with each other to squeeze the tube in a flat-laid condition and transversally seal it. One known machine of this kind is known from patent application EP 887264. Obviously, forming devices constructed in accordance with the present invention could be used in connection with such chain-based machines. In connection with both the guide design and the chain design, solutions with symmetrical as well as asymmetrical movement of the sealing jaws and volume control elements of each forming device are possible. Such asymmetrical movement could reduce stresses in the packaging laminate.

Additionally, the inventive machine described above is arranged to produce packages with an off-centered transverse seal and, therefore, an inclined top wall. The machine could instead be arranged to produce packages with other shapes, for example packages with both transverse seals off-centered, either in the same displacement direction or in opposite displacement directions and, therefore, inclined top and bottom walls. Further, the packages can be formed so as to have other cross sections than rectangular in a plane parallel to the bottom wall.

Further, above the transverse sealing has been effected by means of induction sealing. However, any suitable technique for transverse sealing could be used, such as ultrasonic sealing and hot air sealing.

As one last example, the crease pattern need not be just like the one presented above. For example, the crease lines do not have to be continuous or cross each other as the ones described above.

It should be pointed out that a description of details not relevant to the invention has been omitted.

Finally, it should be pointed out that the figures are not drawn according to scale.

The invention claimed is:

1. A package being made from a packaging laminate web, said packaging laminate web comprising a crease pattern corresponding to one package and repeating itself along the web, said package comprising a front wall, a back wall, first and second opposing side walls, a bottom wall and a top wall, the crease pattern comprising a front crease line defining an extension of the front wall in a longitudinal direction of said package pointing towards the top wall and being parallel to the longitudinal axis of a tube formed from the packaging laminate web, a back crease line defining an extension of the back wall in said longitudinal direction, a first side crease line defining an extension of the first side wall in said longitudinal direction and a second side crease line defining an extension of the second side wall in said longitudinal direction, wherein the first and second side crease lines are inclined in relation to a transverse direction of the web.

2. A packaging laminate for forming liquid food packages, comprising a crease pattern corresponding to one package, said package comprising a front wall, a back wall, first and second opposing side walls, a bottom wall and a top wall, the crease pattern comprising a front crease line defining an extension of the front wall in a longitudinal direction of said final package pointing towards the top wall and being parallel to a longitudinal axis of the packaging laminate, a back crease line defining an extension of the back wall in said longitudinal direction, a first side crease line defining an extension of the first side wall in said longitudinal direction and a second side crease line defining an extension of the second side wall in said longitudinal direction, wherein the first and second side crease lines are inclined in relation to a transverse direction of the packaging laminate.

3. A package according to claim 1, wherein the front and back crease lines are essentially parallel to the transverse direction of the web, the first and second side crease lines being arranged with said predetermined angle of inclination in relation to the front crease line.

4. A package according to claim 1, wherein the packaging laminate web further comprises two mutually opposing longitudinal edge sections arranged to be joined together in an overlapping condition for forming of a longitudinal seal and thereby said tube, the back wall of said package comprising a part of the longitudinal seal and said extension of the back wall being larger than said extension of the front wall in said longitudinal direction.

5. A package according to claim 1, wherein the packaging laminate web further comprises first and second transverse sealing zones intended for first and second transverse seals of the tube, respectively, the web comprising one turn of the crease pattern between the first and second transverse sealing zones, a transverse web portion between the first transverse sealing zone and said crease lines of said one turn of the crease pattern being arranged to form the top wall of said package as well as first and second opposite triangular top flaps of two layers packaging laminate, one of the layers extending from the top wall and the other layer extending from the respective one of the first and second side walls, the top flaps being foldable along the respective side crease lines and thereafter attachable to the respective first and second side walls, the crease pattern further comprising a pair of top flap crease lines associated with each one of the first and second side crease lines, the top flap crease lines of each pair extending in said transverse web portion and defining two free edges of each respective top flap.

6. A package according to claim 1, further comprising an opening device which dimensions are chosen so that the highest point on the opening device lies in the same plane as the highest edge of the package.

7. A package according to claim 1, wherein a transversal distance between longitudinal crease lines, forming the longitudinal edges of the package, is equal between all crease lines.

8. A package being made from a packaging laminate as claimed in claim 2.

9. A package according to claim 8, further comprising an opening device which dimensions are chosen so that the highest point of the opening device lies in the same plane as the highest edge of the package.

10. A package according to claim 8, wherein transversal distances between adjacent longitudinal crease lines, forming longitudinal edges of the package, are equal.

* * * * *